United States Patent [19]

Kanagawa et al.

[11] 4,052,363

[45] Oct. 4, 1977

[54] METHOD OF PROTECTION FROM OZONE DETERIORATION FOR RUBBER

[75] Inventors: Shuichi Kanagawa, Osaka; Shozo Tanimura, Minoo; Seiji Sagawa, Kawachinagano, all of Japan

[73] Assignee: Sumitomo Chemical Company, Limited, Osaka, Japan

[21] Appl. No.: 629,130

[22] Filed: Nov. 5, 1975

[30] Foreign Application Priority Data

Nov. 14, 1974  Japan ................. 49-131763

[51] Int. Cl.² ............................................. C08K 5/17
[52] U.S. Cl. ........................................ 260/45.9 KA
[58] Field of Search ............... 260/45.9 KA, 801

[56] References Cited

U.S. PATENT DOCUMENTS

| | | | |
|---|---|---|---|
| 2,930,777 | 3/1960 | Leeper et al. | 260/45.9 QB |
| 3,008,921 | 11/1961 | Kline | 260/45.9 QB |
| 3,413,259 | 11/1968 | Blumel | 260/45.9 QB |

OTHER PUBLICATIONS

ASTM Special Technical Publication No. 229, Symposium on Effect of Ozone on Rubber.

*Primary Examiner* — V.P. Hoke
*Attorney, Agent, or Firm* — Wenderoth, Lind & Ponack

[57] ABSTRACT

Rubbers are prevented from ozone deterioration without discoloring or staining by the addition of a nitrile of the formula,

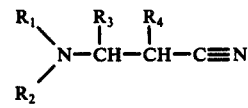

wherein $R_1$ and $R_2$ are each hydrogen, $C_1 - C_{24}$ aliphatic, $C_5 - C_7$ alicyclic or aryl, or $R_1$ and $R_2$ may form together with the adjacent nitrogen atom a heterocyclic group which may further contain oxygen, and $R_3$ and $R_4$ are each hydrogen or lower alkyl.

8 Claims, No Drawings

METHOD OF PROTECTION FROM OZONE DETERIORATION FOR RUBBER

The present invention relates to a new method for inhibiting ozone deterioration of rubbers without problems of discoloring and staining, which method is very effective for protecting natural or synthetic rubbers from the ozone deterioration, i.e., generation and growth of cracks.

Natural or synthetic rubber is generally deteriorated by action of oxygen or ozone resulting in the remarkable deterioration of its physical properties. Particularly in recent years, the deterioration caused by trace amounts of ozone in the atmosphere has become a serious problem.

In order to inhibit the ozone deterioration of rubbers, there have been proposed various methods, for example a method of adding an antiozonant to rubber, and it was found that p-phenylenediamine derivatives act effectively as an antiozonant. These amine compounds, however, have a property such that they are discolored as early as the rubber compounding step and particularly at the vulcanization step, or they are discolored increasingly strongly with a lapse of time by the subsequent action of heat or sunlight, thereby causing discoloration of the rubber itself. Alternatively, the compounds have a property such that they stain the surface of materials which have been brought into contact with the rubber. For this reason, the amine compounds can substantially be used only for the rubber products incorporated with carbon black, irrespective of their excellent property of inhibiting ozone deterioration.

Therefore, a non-discoloring and non-staining antiozonant which can also be used for white rubber products was strongly desired and various studies have been made for this purpose. As a result, it was found that a phenol type or thiourea typ compound has an excellent inhibiting effect toward ozone deterioration. Further, in recent years, a novel antiozonant, having as the major component a compound of the formula

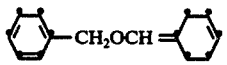

was found to be much superior as a non-discoloring and non-staining antiozonant to the above-mentioned phenol type and thiourea type compounds, and has been used in a large amount. Although this product surely has an excellent non-discoloring and non-staining property, its inhibiting effect toward ozone deterioration is not necessarily satisfactory compared with that of the amine compounds. The inventors have studied a wide range of compounds for the purpose of discovering a non-discoloring and non-staining antiozonant which is much superior to those compounds, and found that a nitrile of the formula (I) has a non-discoloring and non-staining property and has an excellent ability to inhibit the ozone deterioration of vulcanized rubber.

The present invention provides a method for inhibiting ozone deterioration of rubber, which comprises adding to the rubber a nitrile of the formula (I), (I)

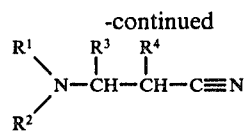

wherein $R_1$ and $R_2$ are each a hydrogen atom, a $C_1 - C_{24}$ aliphatic, $C_5 - C_7$ alicyclic, benzyl or aryl group, or $R_1$ and $R_2$ may form together with the adjacent nitrogen atom a heterocyclic group which may further contain oxygen, and $R_3$ and $R_4$ are each a hydrogen atom or a lower alkyl group.

In the present invention, the aliphatic group includes $C_1 - C_4$ alkyl groups such as methyl, ethyl, propyl, butyl, hexyl, octyl lauryl and stearyl groups, and alkenyl groups such as allyl; the alicyclic group includes $C_5 - C_7$ cycloalkyl groups such as cyclopentyl, cyclohexyl and cycloheptyl groups; the heterocyclic group includes pyrrolidino, morpholino, or a group of the formula

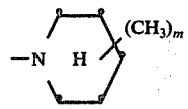

wherein $m$ is zero or an integer of 1 to 2; the aryl group includes phenyl, tolyl and xylyl groups; the lower alkyl group includes methyl, ethyl, propyl and butyl groups.

Nitriles having hydrogen as $R_1$ in the formula (I), and nitriles having morpholino groups as the heterocyclic group in the formula (I) are favorably used. Nitriles represented by the following formula,

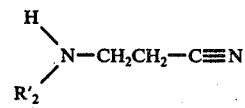

wherein $R'_2$ is a $C_6 - C_{18}$ alkyl group, are more favorably used without any troubles such as bleeding.

As examples of the nitriles of the present invention, various compounds are summarized as follows. The present invention is not however limited to these examples.

N-(2-cyanoethyl)-dimethylamine
N-(2-cyanoethyl)-methylethylamine
N-(2-cyanoethyl)-diethylamine
N-(2-cyanoethyl)-ethylpropylamine
N-(2-cyanoethyl)-dipropylamine
N-(2-cyanoethyl)-dibutylamine
N-(2-cyanoethyl)-dioctylamine
N-(2-cyanoethyl)-distearylamine
N-(2-methyl-2-cyanoethyl)-ethylamine
N-(2-methyl-2-cyanoethyl)-octylamine
N-(2-methyl-2-cyanoethyl)-laurylamine
N-(2-methyl-2-cyanoethyl)-stearylamine
N-(2-methyl-2-cyanoethyl)-benzylamine
N-(2-methyl-2-cyanoethyl)-morpholine
N-(2-cyanoethyl)-ethylamine
N-(2-cyanoethyl)-propylamine
N-(2-cyanoethyl)-butylamine
N-(2-cyanoethyl)-cyclohexylamine
N-(2-cyanoethyl)-octylamine
N-(2-cyanoethyl)-laurylamine
N-(2-cyanoethyl)-stearylamine
N-(2-cyanoethyl)-tetraeicosylamine N-(2-cyanoethyl)-allylamine
N-(2-cyanoethyl)-hexylamine
N-(2-cyanoethyl)-dodecylamine
N-(2-propyl-2-cyanoethyl)-ethylamine
N-(2-propyl-2-cyanoethyl)-octylamine
N-(2-propyl-2-cyanoethyl)-stearylamine
N-(2-propyl-2-cyanoethyl)-benzylamine
N-(2-cyanoethyl)-morpholine
N-(2-propyl-2-cyanoethyl)-morpholine
N-(2-methyl-2-cyanoethyl)-morpholine
N-(2-cyanoethyl)-3,5-dimethylpiperidine The nitrile of the formula (I) can easily be prepared, for example, by reacting an aqueous or an organic solvent solution of amine with acrylonitrile or derivatives thereof at room temperature (about 20° C.) to 100° C. for one to several hours. [Organic Reaction, Vol. V(1960), 109].

Rubbers which can be used in the present invention include natural rubber and synthetic rubbers such as styrene-butadiene rubber, chloroprene rubber, butadiene rubber, isobutylene-isoprene rubber, isoprene rubber, nitrile-butadiene rubber, ethylene-propylene terpolymer and the like. Further, the nitriles which are used in the present invention have such an outstanding characteristic that they can be used in combination with the conventionally used vulcanizing agents, vulcanization accelerators, inhibiting agents for heat-aging and flex-cracking, antioxidants, pigments and other rubber-compounding agents, without any adverse effect on the vulcanization property and other physical properties of rubber, and in addition with some degree of inhibiting effect toward scorching. Further, the nitriles of the present invention can also be used for producing white, pale or colored rubber products to which the conventional amine type antiozonants would be applied with hesitation. Furthermore, the nitriles are prepared on an industrial scale economically and advantageously so that they have a great significance in a practical use.

The amount of the present antiozonants used is generally 0.01 to 10% by weight, preferably 0.1 to 5% by weight, based on the rubber. The performance of the antiozonants can be increased outstandingly by combination with petroleum waxes.

Further, the performance of the present antiozonants can be extremely enhanced by combination with other antiozonants, for example the nitriles of the following formula (II) disclosed in Japanese Patent Publication No. 102771/1974, $$R-S-(CH)_n-C\equiv N \quad \text{(II)}$$
$$\overset{|}{R'}$$

wherein R is a $C_1 - C_{18}$ alkyl or $$-(CH)_n-C\equiv N$$
$$\overset{|}{R'}$$

group; R' is a hydrogen atom, a methyl or ethyl group; and n is an integer of 1 to 5.

The present invention will be illustrated in detail with reference to the following examples. The present invention is not however limited to these examples. All parts in the examples are by weight.

EXAMPLE 1

Two parts of each of the present compounds in Table 1 and a commercially available antiozonant as a counterpart were individually mixed with the following rubber compound,

|  | parts |
|---|---|
| pale crepe #1 | 100 |
| stearic acid | 2 |
| zinc oxide | 5 |
| white carbon (Carplex #80) | 30 |
| light calcium carbonate | 40 |
| titanium dioxide | 10 |
| softener (Circosol 42 XH) | 10 |
| activator (Acting SL) | 1 |
| sulfur | 2.5 |
| dibenzothiazyl disulfide | 0.8 |
| tetramethylthiuram monosulfide | 0.1 |
| petroleum wax | 2.5 | and each resulting mixture was milled on a 2-roll mill of 10 inch diameter and then vulcanized at 140° C. for 20 minutes. A blank test was also carried out using the rubber compound alone. Dumbbel No. 2 test pieces were prepared from each vulcanized batch thus obtained according to ASTM D-412-51T. The static and dynamic ozone deterioration tests were made on the test pieces on the Ozone Weather-O-Meter produced by Toyo Rika Co., Ltd. In the static test, the Dumbbel No. 2 test pieces were elongated by 20% and exposed to a stream of ozone. In the dynamic test, the test pieces were given repeated elongations of from 0 to 20% once a second in the stream of ozone.

The tests were carried out under the condition that the ozone concentration was 50 ± 5 pphm and the test temperature was 50° ± 10° C., and the time required for visually observable cracks to appear on the surface of the vulcanized rubber was measured. The time was taken as a crack-generating time and used as a measure of ozone-resistance. The results of the static and dynamic ozone deterioration tests are summarized in Table 2 and Table 3, respectively.

Table 1

| Sample No. | Sample |
|---|---|
| A | $CH_3\!\!\diagdown$<br>$\qquad N-(CH_2)_2-C\equiv N$<br>$CH_3\!\!\diagup$ |
| B | $\qquad\qquad\qquad CH_3$<br>$C_{12}H_{25}NH-CH_2-\overset{|}{C}H-C\equiv N$ |
| C | $C_{18}H_{37}NH-(CH_2)_2-C\equiv N$ |
| D |  |
| E | $\qquad\qquad\qquad C_3H_7$<br>$C_8H_{17}NH-CH_2-\overset{|}{C}H-C\equiv N$ |
| F | 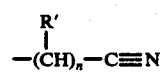$-CH_2-NH-CH_2-\overset{\overset{CH_3}{|}}{C}H-C\equiv N$ |
| G | ⟨H⟩$-NH-(CH_2)_2-C\equiv N$* |
|  | *Commercially available antiozonant having as the major component the compound of the formula |
| H | ⟨⟩$-CH_2-O-CH=$⟨⟩<br>(Antiozonant AFD, produced by Bayer) |

Table 2

(Static ozone deterioration test)

| | Test No. | Sample No. | Amount added (part) | Crack-generating time (hours) |
|---|---|---|---|---|
| Example | 1 | A | 2 | 48 |
| | 2 | B | 2 | 46 |
| | 3 | C | 2 | 50 |
| | 4 | D | 2 | 45 |
| | 5 | E | 2 | 43 |
| Reference | 6 | H | 2 | 33 |
| | 7 | no addition | | 22 |

Table 3

(Dynamic ozone deterioration test)

| | Test No. | Sample No. | Amount added (part) | Crack-generating time (hours) |
|---|---|---|---|---|
| Example | 8 | A | 2 | 25 |
| | 9 | B | 2 | 22 |
| | 10 | C | 2 | 31 |
| | 11 | D | 2 | 24 |
| | 12 | E | 2 | 23 |
| Reference | 13 | H | 2 | 8 |
| | 14 | no addition | | 3 |

EXAMPLE 2

Two parts of each of the present compounds in Table 1 and Antiozonant AFD as a counterpart were individually mixed with the following rubber compound.

| | parts |
|---|---|
| SBR #1502 | 100 |
| stearic acid | 1 |
| zinc oxide | 5 |
| white carbon (Carplex #80) | 30 |
| light calcium carbonate | 20 |
| titanium dioxide | 10 |
| softener (Circosol 42 XH) | 10 |
| activator (Acting SL) | 1 |
| sulfur | 2 |
| dibenzothiazyl disulfide | 1.5 |
| tetramethylthiuram monosulfide | 0.2 |
| petroleum wax | 2.5 | and each resulting mixture was milled on a 2-roll mill of 10 inch diameter and then vulcanized at 150° C. for 30 minutes. A blank test was also carried out using the rubber compound alone. The ozone deterioration tests were carried out under the same conditions as described in Example 1 using the vulcanized batch thus obtained.

The results of the static and dynamic ozone deterioration tests are summarized in Table 4 and Table 5, respectively.

Table 4

(Static ozone deterioration test)

| | Test No. | Sample No. | Amount added (part) | Crack-generating time (hours) |
|---|---|---|---|---|
| Example | 15 | A | 2 | 45 |
| | 16 | B | 2 | 43 |
| | 17 | C | 2 | 46 |
| | 18 | F | 2 | 44 |
| | 19 | G | 2 | 43 |
| Reference | 20 | H | 2 | 30 |
| | 21 | no addition | | 15 |

Table 5

(Dynamic ozone deterioration test)

| | Test No. | Sample No. | Amount added (part) | Crack-generating time (hours) |
|---|---|---|---|---|
| Example | 22 | A | 2 | 25 |
| | 23 | B | 2 | 21 |
| | 24 | C | 2 | 30 |
| | 25 | F | 2 | 22 |
| | 26 | G | 2 | 24 |
| Reference | 27 | H | 2 | 6 |
| | 28 | no addition | | 2 |

EXAMPLE 3

Two parts of each of the present compounds in Table 1 and Antiozonant AFD as a counterpart were individually mixed with the following rubber compound,

| | parts |
|---|---|
| Chloroprene rubber WRT | 100 |
| stearic acid | 0.5 |
| zinc oxide | 5 |
| magnesia | 4 |
| light calcium carbonate | 45 |
| titanium dioxide | 5 |
| 2-mercapto imidazoline | 0.5 |
| petroleum wax | 2.5 | and each resulting mixture was milled on a 2-roll mill of 10 inch diameter and then vulcanized at 150° C. for 30 minutes. A blank test was also carried out using the rubber compound alone. The ozone deterioration tests were carried out in completely the same manner as described in Example 1 except that the ozone concentration was 90 ± 5 pphm.

The results of the static and dynamic ozone deterioration tests are summarized in Table 6 and Table 7, respectively.

Table 6

(Static ozone deterioration test)

| | Test No. | Sample No. | Amount added (part) | Crack-generating time (hours) |
|---|---|---|---|---|
| Example | 29 | A | 1.5 | 143 |
| | 30 | B | 1.5 | 151 |
| | 31 | C | 1.5 | 145 |
| | 32 | D | 1.5 | 130 |
| | 33 | E | 1.5 | 136 |
| Reference | 34 | H | 1.5 | 103 |
| | 35 | no addition | | 60 |

Table 7

(Dynamic ozone deterioration test)

| | Test No. | Sample No. | Amount added (part) | Crack-generating time (hours) |
|---|---|---|---|---|
| Example | 36 | A | 1.5 | 165 |
| | 37 | B | 1.5 | 156 |
| | 38 | C | 1.5 | 170 |
| | 39 | D | 1.5 | 143 |
| | 40 | E | 1.5 | 135 |
| Reference | 41 | H | 1.5 | 69 |
| | 42 | no addition | | 43 |

EXAMPLE 4

Vulcanized rubber was tested for its discoloring and staining properties by the following test method. The test pieces in strip form were prepared from each white vulcanized batch of natural rubber which was the same as obtained in Example 1. Each test piece was placed on paper coated with a nitrocellulose based white lacquer, and the whole was fixed, with the test piece upward, to an exposure frame which faced the south at 45 degrees of inclination angle, and exposed to the sunlight for 15 days. The results of the exposure test are shown in Table 8.

Table 8

|  | Test No. | Sample No. | Amount added (part) | Shade of test piece after test | Shade of lacquer-coated surface after test |
|---|---|---|---|---|---|
|  | 43 | A | 2 | very pale yellow | very pale yellow |
| Example | 44 | B | 2 | " | white |
|  | 45 | C | 2 | " | very pale yellow |
|  | 46 | D | 2 | " | " |
|  | 47 | E | 2 | " | " |
|  | 48 | F | 2 | " | " |
|  | 49 | G | 2 | " | " |
| Reference | 50 | H | 2 | pale yellow | pale yellow |
|  | 51 | no addition | | " | " |

The result obtained indicates that the nitriles of the present invention are superior to the well-known commercially available antiozonant which is said to have the most excellent non-discoloring and non-staining properties, and that they are also remarkably superior to the Antiozonant AFD in inhibiting ozone deterioration.

Waht is claimed is:

1. A method for inhibiting ozone deterioration of rubber which comprises adding to the rubber an effective antiozonant amount of a nitrile of the formula

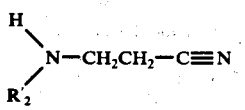

wherein R'$_2$ is alkyl of 6–18 carbon atoms.

2. The method according to claim 1, wherein said nitrile is

3. The method according to claim 1, wherein said nitrile is

4. The method according to claim 1, wherein said nitrile is

5. The method according to claim 1, wherein said nitrile is

6. The method according to claim 1, wherein said nitrile is added in an amount of 0.01 to 10% by weight based on the weight of the rubber.

7. The mehtod according to claim 1, wherein the rubber is one member selected from the group consisting of natural rubber, styrenebutadiene rubber, chloroprene rubber, butadiene rubber, isobutylene-isoprene rubber, isoprene rubber, nitrile-butadiene rubber and ethylene-propylene terpolymer.

8. A composition comprising rubber and a nitrile of the formula

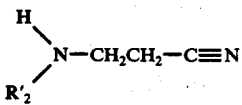

wherein R'$_2$ is alkyl of 6–18 carbon atoms.

* * * * *